United States Patent
Ise

(10) Patent No.: US 11,361,408 B2
(45) Date of Patent: Jun. 14, 2022

(54) IMAGE PROCESSING APPARATUS, SYSTEM, IMAGE PROCESSING METHOD, AND NON-TRANSITORY COMPUTER-READABLE STORAGE MEDIUM

(71) Applicant: CANON KABUSHIKI KAISHA, Tokyo (JP)

(72) Inventor: Yasuaki Ise, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 145 days.

(21) Appl. No.: 16/739,652

(22) Filed: Jan. 10, 2020

(65) Prior Publication Data

US 2020/0234412 A1    Jul. 23, 2020

(30) Foreign Application Priority Data

Jan. 21, 2019  (JP) .............................. JP2019-007955

(51) Int. Cl.
  *G06T 5/50*  (2006.01)
  *G06T 5/00*  (2006.01)
  *H04N 9/04*  (2006.01)
  *H04N 5/235*  (2006.01)

(52) U.S. Cl.
  CPC ............... *G06T 5/002* (2013.01); *G06T 5/50* (2013.01); *H04N 5/2353* (2013.01); *H04N 9/04* (2013.01); *G06T 2207/10024* (2013.01); *G06T 2207/10048* (2013.01); *G06T 2207/20221* (2013.01)

(58) Field of Classification Search
  None
  See application file for complete search history.

(56) References Cited

U.S. PATENT DOCUMENTS

| | | | |
|---|---|---|---|
| 2011/0134293 A1* | 6/2011 | Tanaka | H04N 5/332 348/280 |
| 2018/0188634 A1 | 7/2018 | Lundberg et al. | |
| 2018/0227509 A1* | 8/2018 | Huang | H04N 9/646 |

(Continued)

FOREIGN PATENT DOCUMENTS

| | | |
|---|---|---|
| CN | 1794783 A | 6/2006 |
| CN | 103369257 A | 10/2013 |
| CN | 104662891 A | 5/2015 |

(Continued)

OTHER PUBLICATIONS

CN Office Action issued by the China National Intellectual Property Administration dated Jun. 17, 2021 in corresponding CN Patent Application No. 202010008526 (translation to follow).

*Primary Examiner* — Christopher G Findley
(74) *Attorney, Agent, or Firm* — Carter, DeLuca & Farrell LLP

(57) ABSTRACT

An image processing apparatus comprising, a specifying unit configured to specify, in a visible light image, a region having color information similar to first color information at a position where the visible light image is designated, an extraction unit configured to extract second color information from the specified region in the visible light image, and, a composition unit configured to generate a composite image by superimposing the second color information on the specified region in an invisible light image synchronously captured by an optical system common to the visible light image.

16 Claims, 11 Drawing Sheets

(56) References Cited

U.S. PATENT DOCUMENTS

2019/0354003 A1   11/2019   Ise

FOREIGN PATENT DOCUMENTS

| CN | 105069768 A | 11/2015 |
| CN | 105447838 A | 3/2016 |
| CN | 106385530 A | 2/2017 |
| CN | 107240094 A | 10/2017 |
| CN | 107534727 A | 1/2018 |
| CN | 107534733 A | 1/2018 |
| GB | 2143397 A | 2/1985 |
| JP | 2014135627 A | 7/2014 |

* cited by examiner

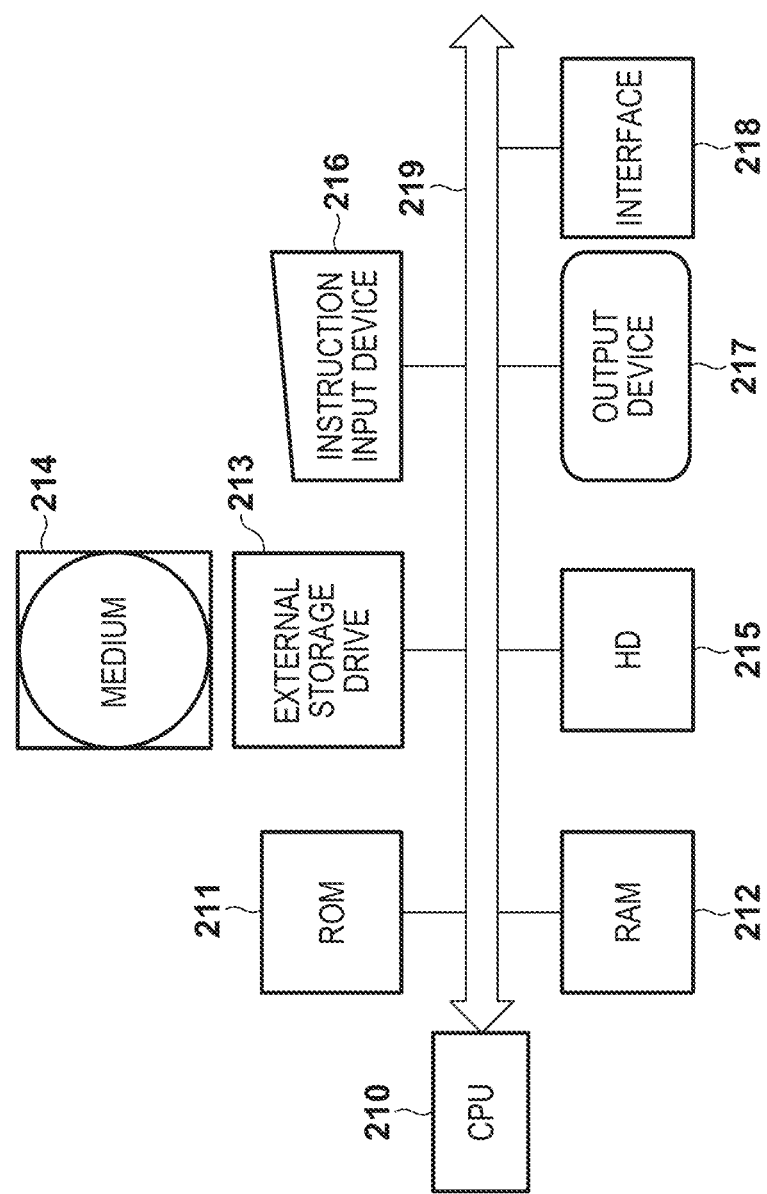

IMAGE PROCESSING APPARATUS, SYSTEM, IMAGE PROCESSING METHOD, AND NON-TRANSITORY COMPUTER-READABLE STORAGE MEDIUM

BACKGROUND OF THE INVENTION

Field of the Invention

The present invention relates to an image processing apparatus, a system, an image processing method, and a non-transitory computer-readable storage medium.

Description of the Related Art

There is provided an image capturing apparatus that can function as an image processing apparatus capable of generating a color image even in a low-illumination environment by capturing a visible light image and an invisible light image and compositing them. When such apparatus is used especially for a monitoring purpose, it is desirable to be able to reproduce the color of an object even in a low-illumination environment. Japanese Patent Laid-Open No. 2014-135627 proposes a technique in which whether sufficient illumination can be obtained in an environment is determined based on setting information at the time of image capturing, and a composition ratio of a visible light image and an invisible light image is made variable based on the determination result.

In the above-described technique, however, the visible light image is composited intact, and thus the generated composite image is strongly influenced by noise of the visible light image. Consequently, especially in a low-illumination environment, the composite image has much noise.

SUMMARY OF THE INVENTION

The present disclosure provides a technique for making it possible to generate a composite image less influenced by noise of a visible light image.

One aspect of exemplary embodiments relates to an image processing apparatus comprising, a specifying unit configured to specify, in a visible light image, a region having color information similar to first color information at a position where the visible light image is designated, an extraction unit configured to extract second color information from the specified region in the visible light image, and, a composition unit configured to generate a composite image by superimposing the second color information on the specified region in an invisible light image synchronously captured by an optical system common to the visible light image.

Further features of the present invention will become apparent from the following description of exemplary embodiments (with reference to the attached drawings).

BRIEF DESCRIPTION OF THE DRAWINGS

FIG. 1B is a block diagram showing an example of the hardware arrangement of each apparatus forming the system 10 according to the exemplary embodiment;

DESCRIPTION OF THE EMBODIMENTS

Figure 1A:
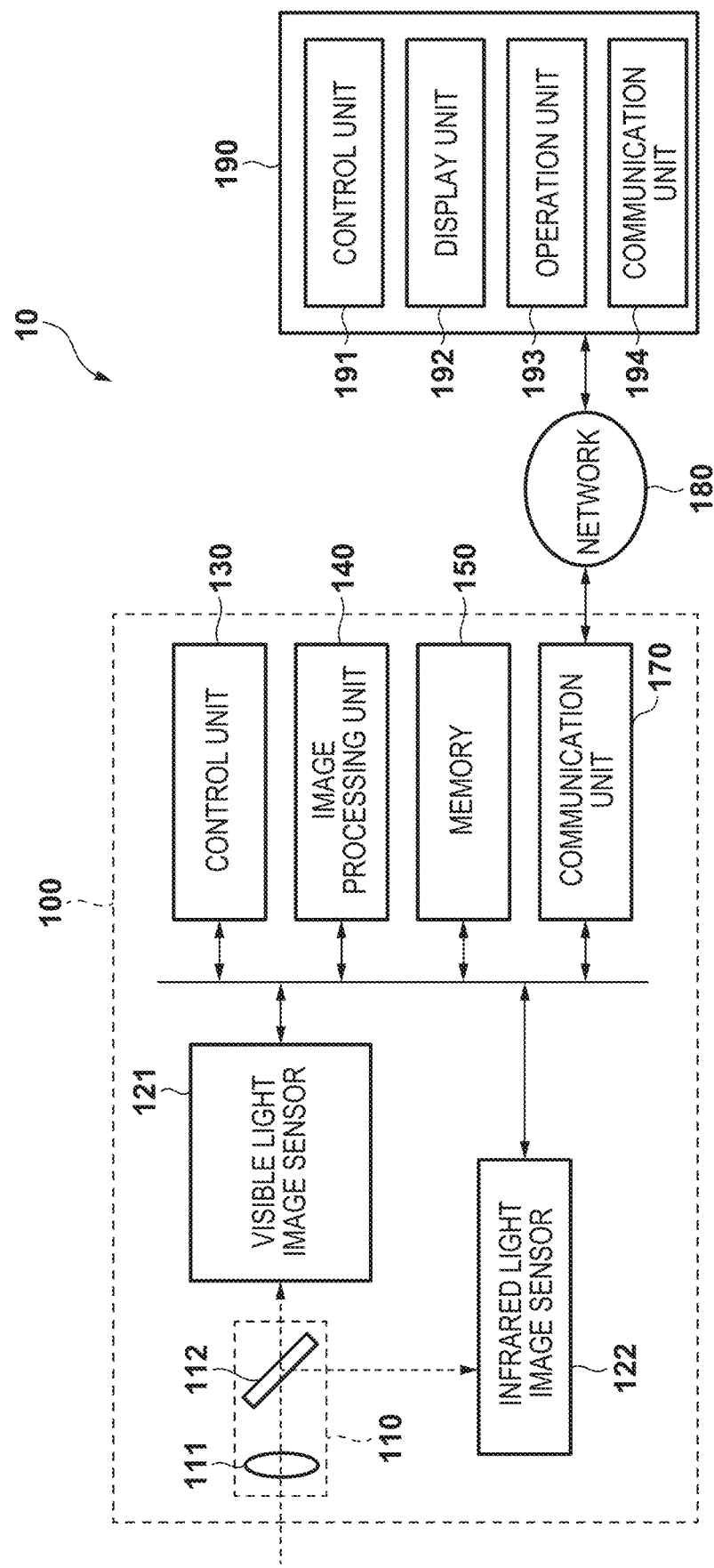
FIG. 1A is a block diagram showing an example of the arrangement of a system 10 according to an exemplary embodiment.

Embodiments of the present invention will be described in detail below with reference to the accompanying drawings. Note that the following embodiments do not limit the invention according to the scope of the appended claims. Although a plurality of features are described in the embodiments, not all the features are essential to the invention and the plurality of features may arbitrarily be combined. Throughout the accompanying drawings, the same reference numerals denote the same or similar components and a repetitive description thereof will be omitted.

First Embodiment

FIG. 1A is a block diagram showing an example of the arrangement of a system 10 according to this embodiment. The system 10 according to this embodiment is formed by connecting an image capturing apparatus 100 and an information processing apparatus 190 to each other via a network 180.

The arrangements of the image capturing apparatus 100 and the information processing apparatus 190 according to the embodiment will be described below. The image capturing apparatus 100 is formed as, for example, an image processing apparatus including one optical system 110 and two image sensors 121 and 122 sharing the optical system 110. As an example, the image sensors include the visible light image sensor 121 that receives visible light having passed through the optical system 110 and generates an image signal and an infrared light image sensor (invisible light image sensor) that receives infrared light as invisible light having passed through the optical system 110 and generates an image signal. Each of the image sensors 121 and 122 is formed by a CMOS sensor or the like, and converts an object image formed on an imaging plane into an electrical signal and outputs it. An image capturing signal as the electrical signal output from the image sensor 121 or the like is input to an image processing unit 140.

An optical mechanism 111 of the optical system 110 is formed by a lens group and control mechanisms for the zoom, the focus, the stop, camera shake correction, and the like. An optical mechanism 112 is, for example, a prism for wavelength division. For example, a dichroic mirror for wavelength division is arranged to pass visible light and reflect infrared light. The transmitted visible light component is photoelectrically converted by the visible light image sensor 121 arranged behind the dichroic mirror, thereby generating an image. On the other hand, the infrared light component reflected by the dichroic mirror is photoelectrically converted by the infrared light image sensor 122 arranged by passing through an optical axis, thereby generating an image.

The visible light image sensor 121 and the infrared light image sensor 122 are connected to a control unit 130 and the image processing unit 140 to be controlled, and perform synchronous image capturing using the optical system 110 as a common optical system. Image capturing signals obtained by such synchronous image capturing undergo composition processing of the succeeding stage to form a composite image of one frame. Hereinafter, "each frame" indicates image capturing signals obtained by synchronous image capturing or images obtained from the image capturing signals. The image capturing signal transmitted from the image sensor 121 or the like undergoes various kinds of image processes in the image processing unit 140.

The image capturing apparatus 100 can include an invisible light illumination device (not shown) formed by an LED light source for generating infrared light. Even in a low-illumination environment in which no sufficient luminance can be obtained in a visible light image, it is possible to obtain a sufficient luminance in an infrared light image by performing radiation with invisible light.

The image processing unit 140 performs image processing such as pixel interpolation processing and color conversion processing for the image capturing signal, thereby generating captured image data (to also be referred to as a "captured image" or "pre-composition image" as an image to undergo composition processing hereinafter) for each image sensor. The image processing includes, for example, various kinds of correction processes such as pixel defect correction and lens correction, detection processing for adjusting the black level, focus, and exposure, demosaic processing, white balance processing, gamma correction processing, edge enhancement processing, and noise suppression processing.

Each captured image is saved in a memory 150. Furthermore, in the low-illumination environment, the captured images for the respective image sensors saved in the memory 150 are sequentially composited for each frame by an image composition unit in the image processing unit 140, and saved in the memory 150 as a composite image of the visible light image and the invisible light image (infrared light image).

The control unit 130 can be formed by, for example, a CPU, an MPU, another dedicated calculation circuit, or the like, and controls the overall image capturing apparatus 100. The memory 150 is formed by a nonvolatile memory, a RAM, and the like. The nonvolatile memory stores the processing procedure (control program) of the control unit 130 and various parameters. The RAM is used as the work area of the control unit 130, and is also used as a memory area for performing image processing. In addition, the control unit 130 can include the image processing unit 140, the image composition unit (not shown), and a compression/decompression unit. The processing functions of these blocks can be implemented when, for example, the CPU executes corresponding programs stored in the memory 150. Alternatively, the processing functions may be implemented by the dedicated calculation circuit forming the control unit 130.

The control unit 130 further generates a compressed image by compressing the composite image by the compression/decompression unit (not shown). The compression/decompression unit executes still image compression and moving image compression, and an image compression method can be based on the standard such as H.264, H.265, MPEG, or JPEG. Furthermore, an image in an arbitrary format including MP4 or AVI format may be generated. The compressed image generated by the compression/decompression unit is recorded in the memory 150, a recording medium (not shown) attached to the image capturing apparatus 100, or the like, and is also transmitted from a communication unit 170 to the external information processing apparatus 190 via the network 180. The communication unit 170 is a network processing circuit, and converts the compressed composite image into a communication signal complying with a communication protocol and then distributes it onto the network 180. The network 180 can be formed as, for example, a communication line capable of performing IP-based communication, such as a LAN or the Internet.

The information processing apparatus 190 is typically formed as a personal computer or the like, and is connected to the image capturing apparatus 100 via the network 180. A control unit 191 of the information processing apparatus 190 can be formed by a CPU, an MPU, another dedicated calculation circuit, or the like, and controls the overall information processing apparatus 190. The control unit 191 receives the composite image from the image capturing apparatus 100 to perform decompression processing, and also executes various control operations by transmitting control information for controlling the image capturing apparatus 100. A display unit 192 displays a user interface (UI) and the image received from the image capturing apparatus 100 to the user (operator) of the information processing apparatus 190. An operation unit 193 is a physical user interface that accepts an operation input from the user. It is possible to perform a desired control input operation by operating a mouse, a keyboard, or the like based on the user interface (UI) such as an icon displayed on the display unit 192. A communication unit 194 is a network processing circuit, and can communicate with the image capturing apparatus 100 via the network 180 to receive the composite image distributed by the image capturing apparatus 100, and also control the operation of the image capturing apparatus 100.

FIG. 1B shows an example of the hardware arrangement of each of the above-describe image capturing apparatus 100 and the information processing apparatus 190. FIG. 1B is a block diagram showing an example of the hardware arrangement mainly concerning the control unit and the processing unit of each of the image capturing apparatus 100 and the information processing apparatus 190. FIG. 1B does not illustrate the image sensors and the optical mechanisms in the image capturing apparatus 100.

Referring to FIG. 1B, a CPU 210 implements processing according to the embodiment by executing an operating system (OS), a control program, a processing program, and the like stored in a hard disk drive (to be referred to as an HD hereinafter) 215. Furthermore, the CPU 210 controls data transmission/reception to/from an external apparatus via an interface (I/F) 218. The CPU 210 can function as the control unit 130 or the control unit 191 in FIG. 1A.

A ROM 211 stores a basic I/O program as well as various data such as an application program for executing predetermined processing. A RAM 212 temporarily stores various data, and functions as the main memory, the work area, or the like of the CPU 210. An external storage drive 213 is an external storage drive for implementing access to a recording medium, and can load a program and the like stored in a medium (recording medium) 214 into the computer system. As the external storage device 215, an HD (Hard Disk) functioning as a mass memory is used in this embodiment. The HD 215 stores an application program, an OS, a control program, related programs, and the like. Note that a non-volatile storage device such as a Flash® memory may be used instead of the hard disk. The ROM, the RAM, the HD, or the like can function as the memory 150 shown in FIG. 1A.

A keyboard, a pointing device (a mouse or the like), a touch panel, or the like corresponds to an instruction input device 216. The instruction input device 216 corresponds to the operation unit 193 shown in FIG. 1A. A system bus 219 controls a data flow in the apparatus.

An output device 217 outputs a command input from the instruction input device 216, and a response of the apparatus to the command. The output device 217 can include a display, a loudspeaker, and a headphone terminal. The output device 217 corresponds to the display unit 192 shown in FIG. 1A. The system bus 219 controls a data flow in the apparatus.

The interface (to be referred to as the I/F hereinafter) 218 serves to mediate data exchange with an external apparatus. More specifically, the I/F 218 can include a wireless communication module, and the module can include a well-known circuit mechanism including an antenna system, an RF transmitter/receiver, one or more amplifiers, a tuner, one or more oscillators, a digital signal processor, a CODEC chip set, a subscriber identification module card, and a memory. In addition, the I/F 218 can include a wired communication module for wired connection. The wired communication module enables communication with another device via one or more external ports. The I/F 218 can also include various software components that process data. The external port couples another device via Ethernet, USB, IEEE 1394, or the like directly or indirectly through a network. Note that software for implementing a function equivalent to each apparatus described above can substitute the hardware device. The interface 218 can function as the communication unit 170 or 194 shown in FIG. 1A.

Figure 2:
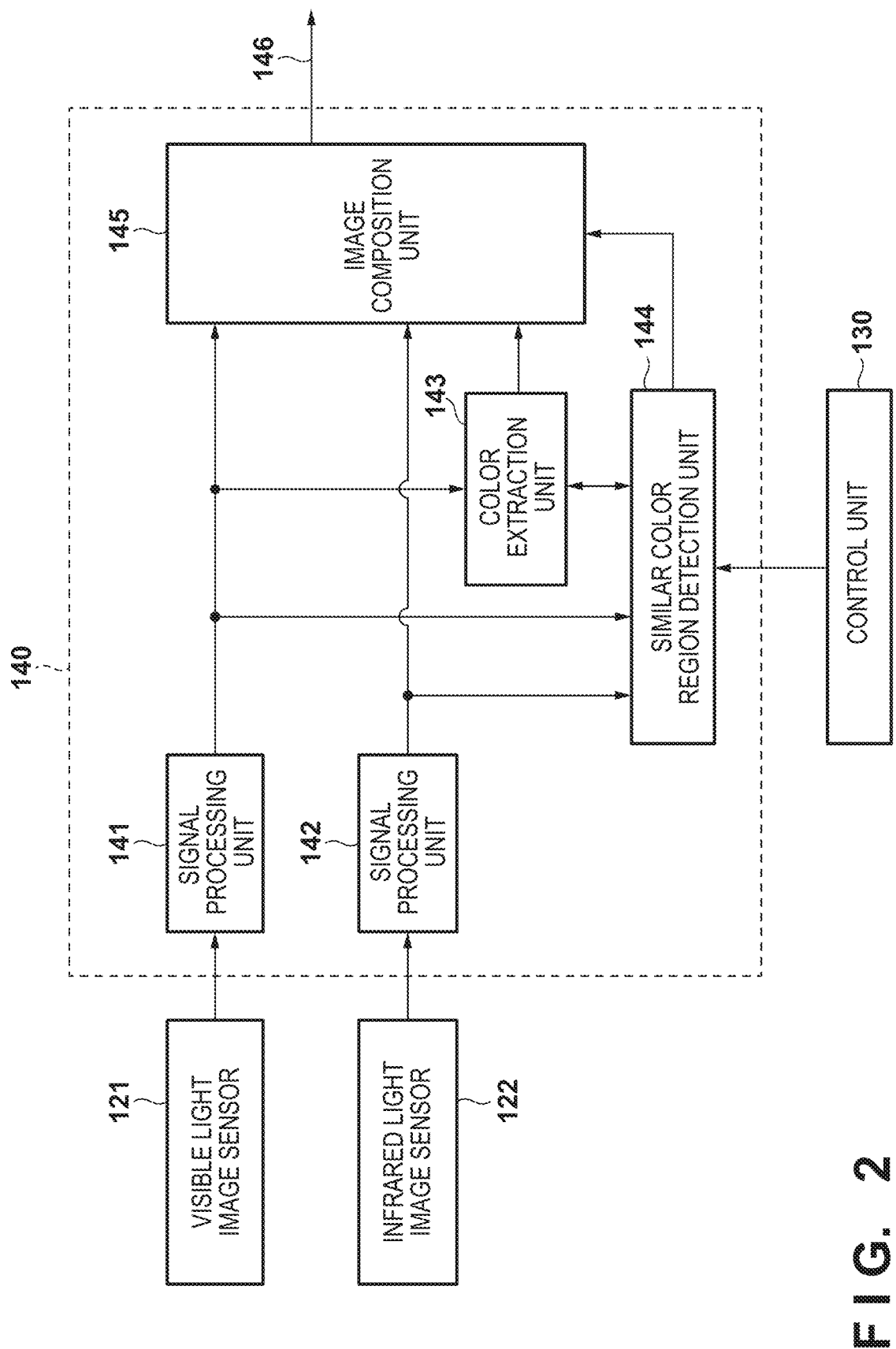
FIG. 2 is a block diagram showing an example of the arrangement of an image processing unit 140 according to the exemplary embodiment.

Image composition processing of the visible light image and the infrared light image in this embodiment will be described next based on the functional arrangement of the image processing unit 140 with reference to FIG. 2. FIG. 2 is a block diagram for explaining the functional arrangement of the image processing unit 140. The image processing unit 140 may be included as a constituent element in the image capturing apparatus 100, or may be formed as an independent image composition apparatus or an image processing apparatus to cooperate with another constituent element connected to the image capturing apparatus 100.

In this embodiment, to reduce the influence of noise in color image composition at the time of low illumination, partial color information is acquired from the visible light image, and superimposed on the infrared light image, thereby generating a composite image. This composite image generation method will be referred to as "color enhancement composition" hereinafter. Furthermore, the image capturing mode of the image capturing apparatus 100, in which a composite image obtained by color enhancement composition is distributed, will be referred to as a "color enhancement display mode" hereinafter.

The image processing unit 140 can include signal processing units 141 and 142, a color extraction unit 143, a similar color region detection unit 144, and an image composition unit 145. Each of the signal processing units 141 and 142 generates a captured image for each image sensor by performing image processing such as pixel interpolation processing and color space conversion processing for the image capturing signal from the image sensor. The image processing includes various kinds of correction processes such as pixel defect correction and lens correction, detection processing for adjusting the black level, focus, and exposure, demosaic processing, white balance processing, gamma correction processing, edge enhancement processing, and noise suppression processing. The visible light image output from the visible light image sensor 121 undergoes color space conversion processing in the signal processing unit 141, and is saved as an image of a luminance/color difference signal (YCbCr) in the memory 150. Furthermore, the infrared light image output from the infrared light image sensor is made into a monochrome image in a format of only a luminance signal (YIR) in the signal processing unit 142 and saved in the memory 150.

The similar color region detection unit 144 has a function of determining color information for each region from the visible light image, grouping pixel regions having similar pieces of color information to generate a similar color region, and generating information of the region. First, the color information extracted for each unit region is compared with a predetermined color difference range based on the color of an object region designated by the user in the visible light image, and color pixel regions falling within the predetermined color difference range are grouped. After that, the grouped regions are set as one similar color region, and information (for example, coordinate information) for specifying the position and shape of the region is stored in the memory 150. Detection of the similar color region may be combined with an existing technique such as edge detection or moving body detection, and an object region falling within the predetermined color difference range can be detected. In addition, it is desired to detect, as a similar color region, a region including a pattern with a high spatial frequency such as a stripe pattern with a narrow pitch. By performing filter processing within a predetermined region range, an edge within the similar color region or a high-contrast region can be acquired as a region where fine shadows and the like are removed.

The color extraction unit 143 extracts color information within each similar color region based on the similar color region and the coordinate information from the control unit 130 and the similar color region detection unit 144. As the extracted color information, for example, a central value as the average value of a predetermined number of pixel regions or an intermediate value obtained by applying a median filter to a pixel value within the similar color region selected as a color information extraction target can be set. A spatial frequency within the similar color region may be detected, and a pixel value under a specific condition may be acquired as a central value of the color information. More specifically, by performing filter processing for a predetermined region, color information in which fine shadows and the like are removed can be acquired from a high-contrast region such as the edge portion of the contour. Furthermore, the color extraction unit 143 may have a function of correcting the extracted color information based on a predetermined conversion formula. For example, the color extraction unit 143 may be configured to convert parameters of, for example, the chroma, brightness, and hue.

The image composition unit 145 performs composition processing of generating a composite image by coupling the captured images obtained from the image sensors. In particular, in this embodiment, partial color information is acquired from the visible light image and superimposed on the infrared light image, thereby generating a composite image. The captured images for the respective image sensors saved in the memory 150 sequentially undergo image composition for each frame in the image composition unit 145, and the generated composite image is saved again in the memory 150. The composition processing composites the images based on composition parameters so that the positions of identical objects in the pre-composition images match each other. The composition parameters include parameters for performing deformation processing such as enlargement, reduction, and distortion correction of each captured image, and parameters for, for example, cutting out an image from the captured image after correction processing. The composition parameters may be calculated in advance based on the arrangement relationship between the optical system 110 and the image sensors 121 and 122, and held in the memory 150. The image capturing apparatus 100 may be configured so it is not necessary to perform alignment by adjusting the arrangements of the optical system 110 and the image sensors.

Figure 3:
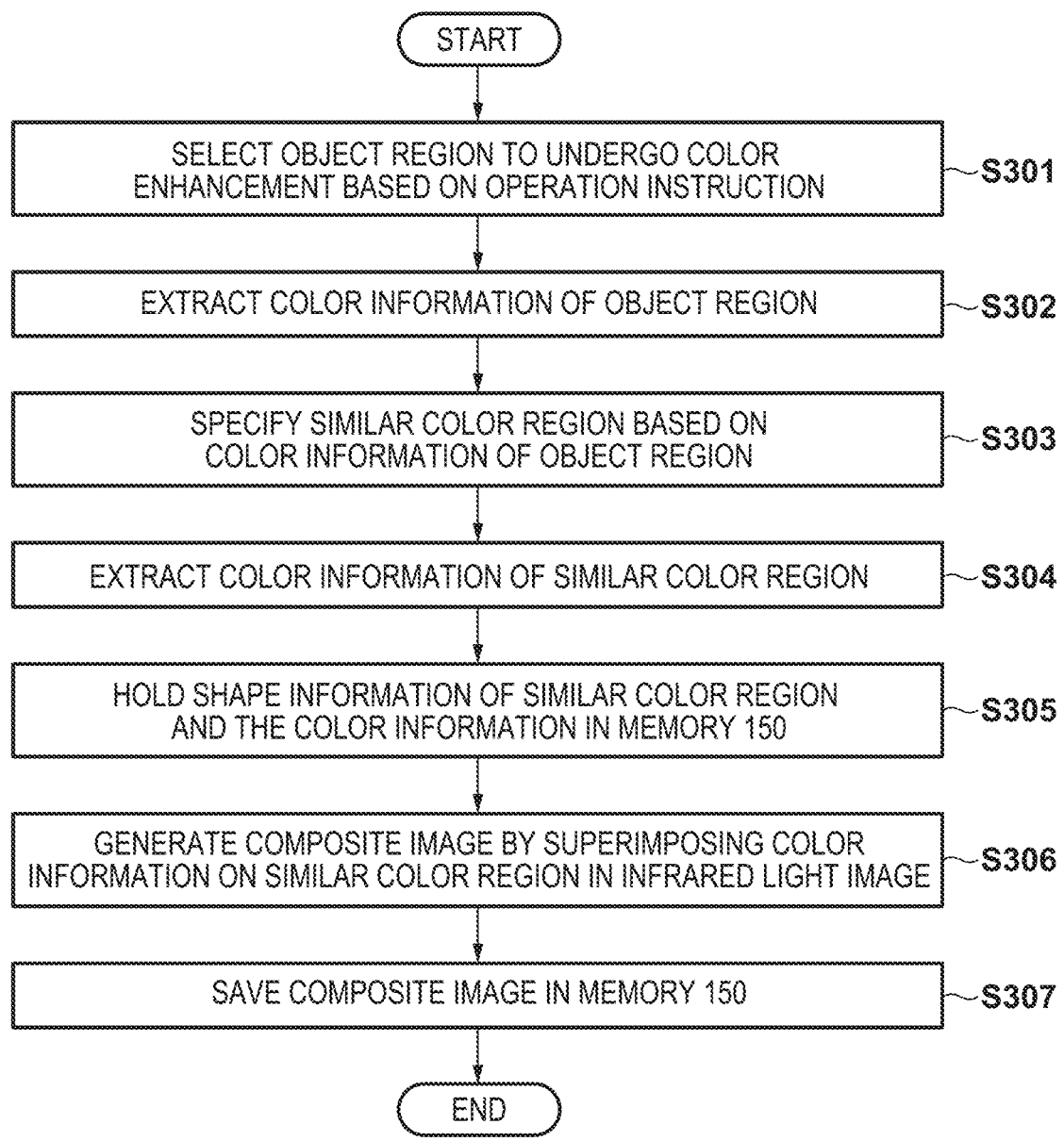
FIG. 3 is a flowchart illustrating an example of image composition processing according to the exemplary embodiment.
Figure 4:
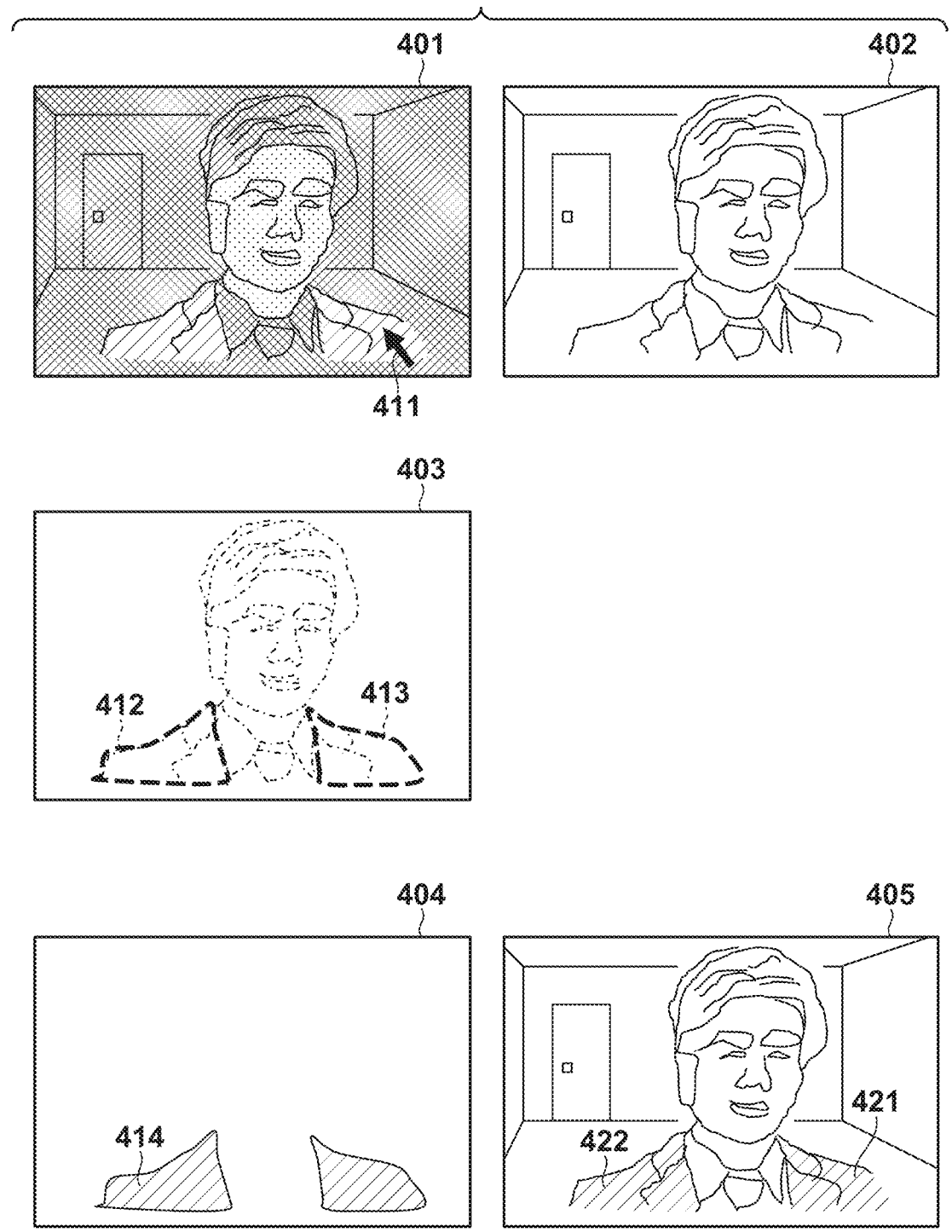
FIG. 4 is a view for explaining the example of the image composition processing according to the exemplary embodiment.

An overview of the image composition processing according to this embodiment will be described next with reference to FIGS. 3 and 4. FIG. 3 is a flowchart corresponding to an example of the image composition processing according to the embodiment. Processing corresponding to the flowchart can be implemented when, for example, one or more processors (CPU and MPU) functioning as the control unit 130 and the image processing unit 140 execute a corresponding program.

In step S301, the control unit 130 selects, based on an operation instruction from the user, an object region to undergo color enhancement display. In selection of the object region, it is only necessary to be able to specify at least a pixel position at which color information is acquired from the visible light image. Thus, a user operation instruction for making the selection may be issued by, for example, designating a region or range of a predetermined size in the visible light image or placing a cursor at a given position on the visible light image and performing a click operation. Upon receiving a control command based on the operation performed by the user in the information processing apparatus 190, the control unit 130 extracts information for specifying an object region from the control command, for example, coordinate information. Then, the control unit 130 transfers the coordinate information of the object region to the color extraction unit 143 via the similar color region detection unit 144.

In step S302, the color extraction unit 143 extracts color information from a region corresponding to the object region in the visible light image. The visible light image captured by the visible light image sensor 121 undergoes signal processing in the signal processing unit 141 and is sent to the color extraction unit 143. Based on the coordinate information from the control unit 130, the color extraction unit 143 extracts the color information of the object region designated by the user in the visible light image. The control unit 130 transmits the extracted color information of the object region to the information processing apparatus 190 via the communication unit 170.

In step S303, the similar color region detection unit 144 specifies a similar color region in the visible light image based on the color information of the object region detected by the color extraction unit 143. A pixel region falling within a predetermined color difference range defined in advance based on the color information of the object region is extracted as a similar color region. The color difference range for determining a similar color region may be stored in advance as a table in the memory 150. Alternatively, the color difference range may be set as a function whose parameters are changeable so that the color difference range can be adjusted by a user operation.

In step S304, the color extraction unit 143 extracts color information of the similar color region specified by the similar color region detection unit 144. In step S305, shape information of the similar color region specified by the similar color region detection unit 144 and the color information of the similar color region extracted by the color extraction unit 143 are held in the memory 150. In step S306, the image composition unit 145 generates a color enhancement composite image based on the shape information of the similar color region acquired from the visible light image, the extracted color information of the similar color region, and the infrared light image. More specifically, a color enhancement composite image is generated by superimposing the extracted color information of the similar color region on a region corresponding to the similar color region in the infrared light image. In step S307, the image composition unit 145 saves the generated color enhancement composite image in the memory 150. As described above, the color enhancement composite image is generated.

The processing shown in FIG. 3 will be described in more detail with reference to FIG. 4. Each image shown in FIG. 4 indicates a captured image obtained when image capturing is performed in a low-illumination environment without any illumination. Images 401 and 405 shown in FIG. 4 are images displayed on the display unit 192 of the information processing apparatus 190. Images 402 to 404 shown in FIG. 4 show examples of images for explaining the processing procedure of the image processing unit 140.

The image 401 is a visible light image, and a captured image in a room, which includes a portion above the chest of a male in the central portion of the image. Since illumination is hardly applied, a luminance or color information is hardly obtained in the visible light image. Alternatively, since image capturing sensitivity is largely increased to a visible level, the captured image has much noise. An arrow 411 indicates the selection position of a region to undergo color enhancement display, which is selected by the user.

The image 402 is an infrared light image, and a monochrome image having no color difference information. In this embodiment, since an infrared light illumination device provided in the image capturing apparatus 100 emits infrared light to an object to be captured, the infrared light image can be captured at an SN ratio higher than that of the visible light image. The image 403 shows examples of the similar color region specified by the similar color region detection unit 144. More specifically, broken line regions 412 and 413 indicate similar color regions determined to have colors similar to the color of the selected object region. In this embodiment, a similar color region is detected or specified as a region where details with a high spatial frequency, such as fine seams of clothing and a stripe pattern with a narrow pitch, are eliminated. The two regions 412 and 413 determined to have similar colors are presented here. However, only the similar color region 413 adjacent to the object region selected by the user may be selected. In this case, the user needs to individually designate an object region for specifying each of the regions 412 and 413.

The image 404 is a schematic view showing color information extracted by the color extraction unit 143 in the similar color regions specified by the similar color region detection unit 144. The color extraction unit 143 removes high-frequency components in the similar color regions 412 and 413, and stores color information 414 after filter processing in linkage with the region information in the memory 150. As an example, each detected similar color region has one central value as color information. By giving color information of about two or three colors to one similar color region, it is possible to provide color information to enable gradation display.

The image 405 is a color enhancement composite image after the composition processing. The image is based on the monochrome image by the infrared light image, and is output, to the information processing apparatus 190, as a color image obtained by compositing the color information with regions 421 and 422 determined to have colors similar to the color of the object region selected by the user.

By performing composition processing to superimpose the color information on the infrared light image, as described above, noise of the visible light image has no influence. Thus, the SN ratio of the composite image can be kept high, and the image has a good appearance. Furthermore, the user can recognize color information more easily by displaying the color information only in a partial region selected by the user.

Figure 5:
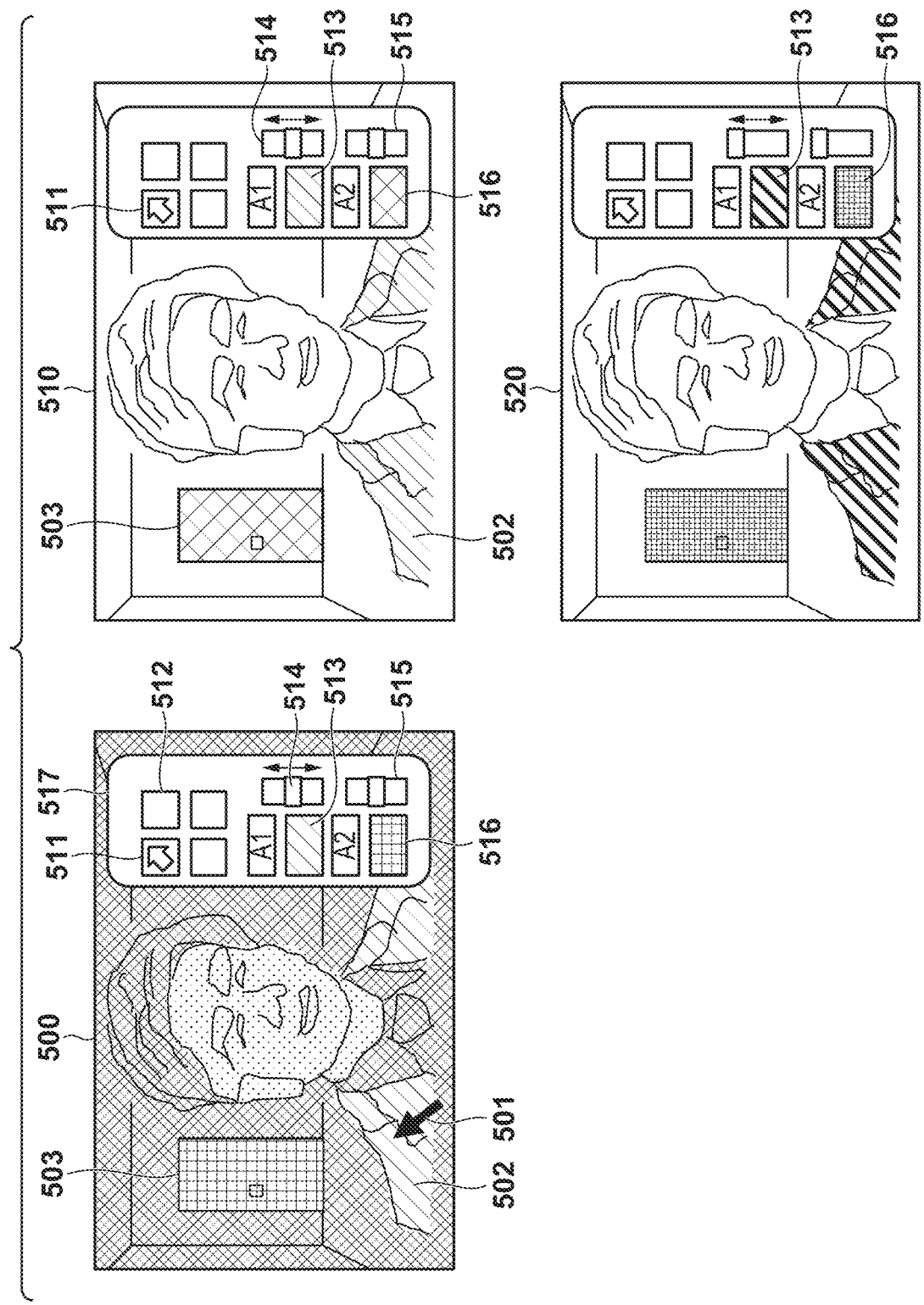
FIG. 5 is a view showing an example of a display screen of an information processing apparatus 190 according to the exemplary embodiment.

Subsequently, display of a user interface (to be referred to as an UI hereinafter) in the information processing apparatus 190 will be described with reference to FIG. 5. Display screens 500, 510, and 520 show examples of a display screen displayed on the display unit 192 of the information processing apparatus 190. The display screen 500 shows a display screen in a state in which the visible light image is displayed. If the color enhancement display mode is selected by a user operation, the image display transitions from the state of the display screen 500 to the state of the display screen 510 or 520. The display screens 510 and 520 are display screens after the user selects the color enhancement display mode. FIG. 5 shows a state in which object regions 502 and 503 are selected as similar color regions to undergo color enhancement display.

The object regions 502 and 503 of the display screen 500 indicate object images included in the captured image. Indicators denoted by reference numerals 501 and 511 to 517 are UI displays superimposed on the captured image displayed on the display screen. The arrow 501 represents a pointer for selecting a region in the display image, and the operation panel 517 organizes operation functions. The icons 511 and 512 are respectively assigned to the operation functions. When, for example, the operation icon 511 is selected, the pointer of the arrow can be displayed on the captured image to select an arbitrary object region. The user can select an object region by operating the pointer to designate an arbitrary position in the object region, designate part of the object region, or surround the object region on the display image by the pointer. The image capturing apparatus 100 detects, as a similar color region, a region including the object region selected by the user.

Each of the regions 513 and 516 in the UI display is a color information display portion where the color information of the selected object region is displayed. The color information extracted by the color extraction unit 143 of the image capturing apparatus 100 is transmitted to the information processing apparatus and displayed in the color information display portion. FIG. 5 exemplifies the two color information display portions. However, the number of display portions is not limited to this, and an arbitrary number of pieces of information can be displayed. In this embodiment, by giving color information of about two or three colors to one similar color region, it is possible to provide color information to enable gradation display. However, if the color information of the selected object is displayed in the color information display portion to the user, the displayed color information is desirably little. To achieve this, in this embodiment, pieces of color information which can simultaneously be displayed in color information display portions may be set to colors separated by a predetermined color difference or more. For example, if an object similar to the hue of one of red, yellow, green, blue, and purple is selected, a region classified into the same hue is set not to be displayed simultaneously. For example, color enhancement display regions to be displayed simultaneously are limited to three regions classified into the three hues of red, blue, and green. This limits the hues which are displayed to the user at once, and thus more clear display is possible.

The icons 514 and 515 indicate operation units each for changing the display intensity of the color information displayed in the color information display portion 513 or 516, which are represented by icons such as slide bars. The display screen 520 is a display screen when the display intensities of the color information display portions 513 and 516 are changed from the state of the display screen 510. By moving up the slide bar 514 or 515 by a user operation in the state of the display screen 510, the color display intensity of the selected similar color display region can be changed. The degree of enhancement of the color information may be changeable in accordance with the amount of the user operation. For example, the brightness, chroma, and hue may be changeable. The hue is desirably changed by not extreme processing of changing the color from red to blue but processing of shifting the hue within a predetermined range.

Color change information selected by the user is successively reflected on the display portion 513 or 516 while being transmitted to the image capturing apparatus 100. The color extraction unit 143 of the image capturing apparatus 100 corrects, based on the color change information received from the information processing apparatus 190 via the control unit 130, the color information to be transmitted to the image composition unit 145. This also corrects the color of the similar color region of the color enhancement composite image in accordance with the user operation, thereby outputting the data to the information processing apparatus 190.

As described in this embodiment, by performing composition processing to superimpose color information obtained from the visible light image, instead of compositing the visible light image with the infrared light image intact, noise of the visible light image has no influence. Thus, the SN ratio of the composite image can be kept high, and the image has a good appearance. Furthermore, the user can recognize color information more easily by displaying the color information only in a partial region selected by the user.

The information processing apparatus 190 can show the color information of the selected object on the display unit 192 more explicitly. In addition, since the color information can be changed, the color information of a desired object can be highlighted more.

Second Embodiment

This embodiment will describe a method of performing color enhancement display on an information processing apparatus 190 by changing the exposure time of an image capturing apparatus 100. As an example, a case in which the brightness of the color of an object at the time of color enhancement display is low will be exemplified.

The user selects a color enhancement display mode like a display screen 510 shown in FIG. 5. At this time, if the user feels that the brightness of a selected object region 502 is low, he/she operates a slide bar 514 or 515, as indicated by a display screen 510, to change the degree of enhancement of color information.

Figure 6:
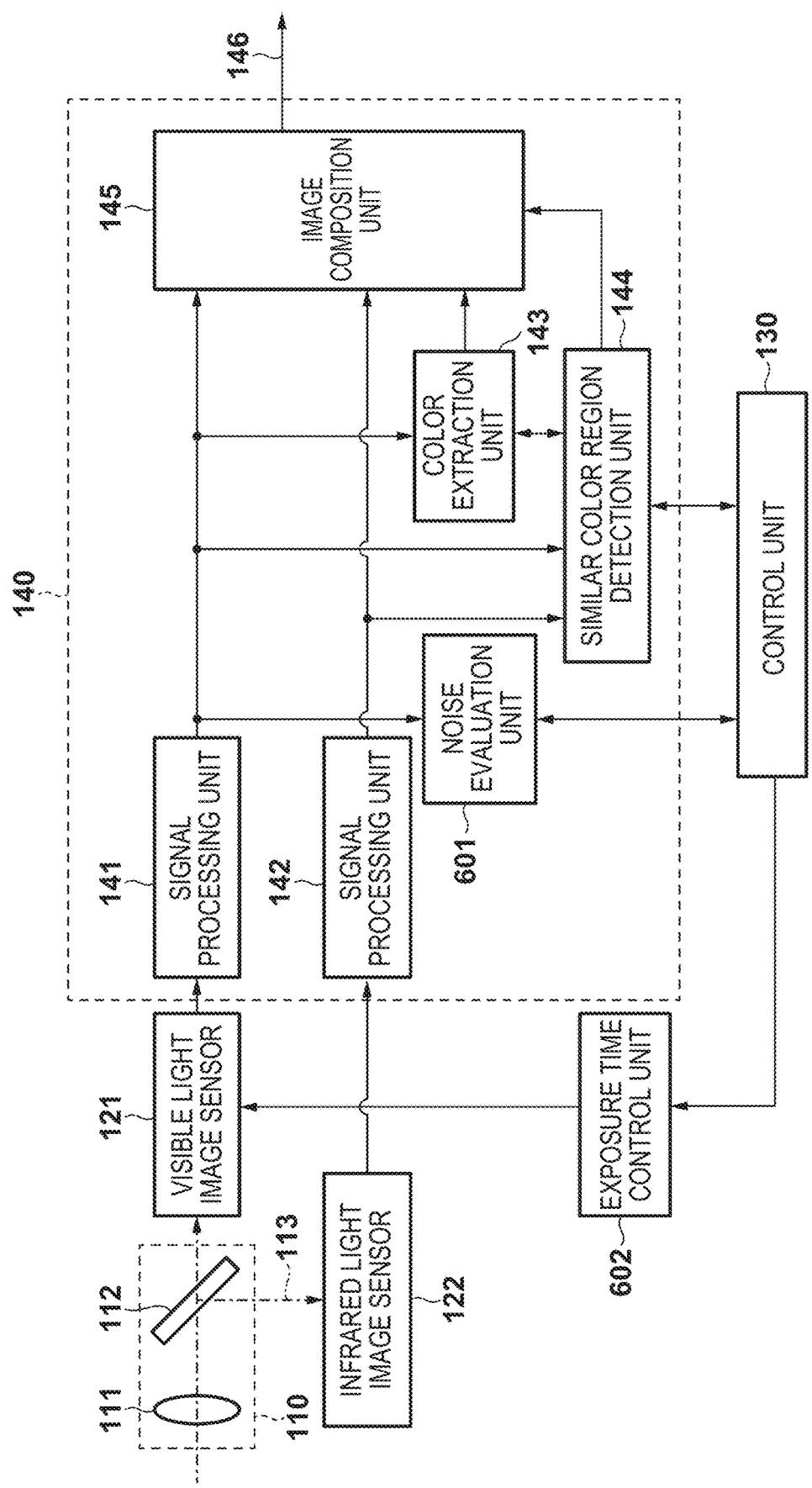
FIG. 6 is a block diagram showing an example of the arrangement of an image processing unit 140 according to another exemplary embodiment.

A system arrangement according to this embodiment is as shown in FIG. 1A, and a hardware arrangement is as shown in FIG. 1B. On the other hand, the arrangement of an image processing unit 140 of the image capturing apparatus 100 according to this embodiment is as shown in FIG. 6. The image processing unit 140 according to this embodiment includes a noise evaluation unit 601 in addition to the arrangement shown in FIG. 2. Furthermore, in correspondence with the arrangement of the image processing unit 140 according to this embodiment, an exposure time control unit 602 is provided between a control unit 130 and a visible light image sensor 121.

In FIG. 6, the same reference numerals as in FIG. 2 denote the same components, and only the difference will be described below. The exposure time control unit 602 controls the exposure time of the visible light image sensor 121 based on a command of the control unit 130. The noise evaluation unit 601 evaluates the noise amount of a captured image of the visible light image sensor 121.

Figure 7:
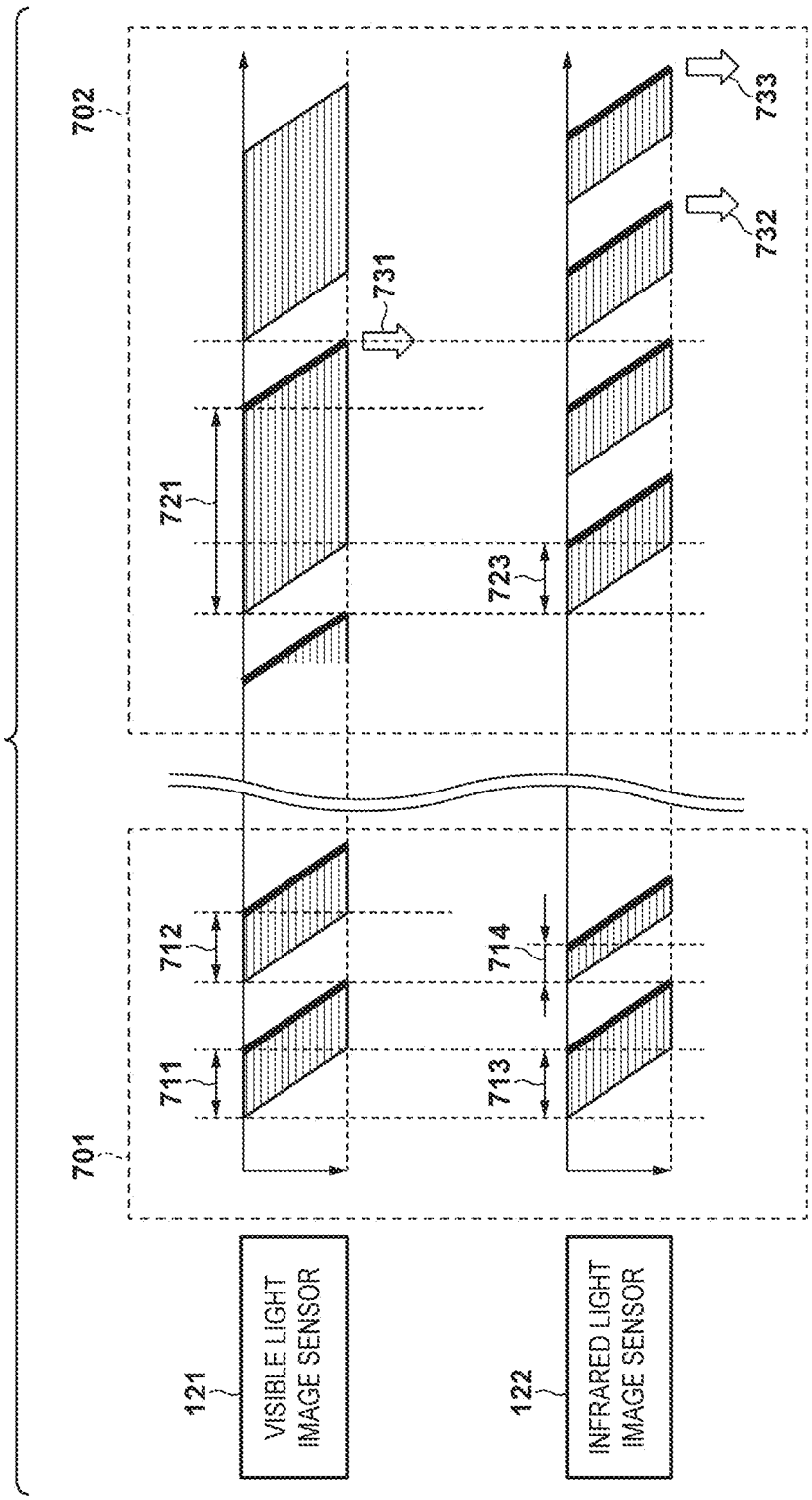
FIG. 7 is a timing chart for explaining a method of controlling the exposure time of a visible light image sensor 121 according to the other exemplary embodiment.

The relationship between the exposure time of the visible light image sensor 121 and that of an infrared light image sensor 122 according to this embodiment will be described next with reference to FIG. 7. FIG. 7 is a timing chart showing an example of the relationship between the exposure time of the visible light image sensor and that of the infrared light image sensor. In FIG. 7, the abscissa represents a temporal change, and the ordinate represents readout in the vertical direction of each image sensor.

The relationship between the exposure times at the time of normal composition is shown in a region of a broken line 701. If the illuminance is equal to or lower than a predetermined value, it is impossible to obtain sufficient luminance information in a visible light image. To cope with this, it is necessary to extend the exposure time or increase the image capturing sensitivity to obtain a desired luminance. However, if the image capturing sensitivity is increased too much, noise is also amplified, and an image having much noise is unwantedly obtained. If the exposure time is extended, an object image blurs, and thus it is necessary to make the exposure time fall within a predetermined time in which the object image does not blur. Therefore, exposure times 711 and 712 of the visible light image sensor are made to fall within the predetermined exposure time in which the object image does not blur. In this case, however, no sufficient luminance can be obtained in the visible light image. The infrared light image sensor that can obtain illumination from an infrared light illumination unit is set with exposure times 713 and 714 equal to or shorter than the exposure time of the visible light image sensor.

On the other hand, in exposure time control in the color enhancement display mode according to this embodiment, control is executed to obtain a sufficient luminance by prolonging the exposure time of the visible light image sensor 121 to the extent that desired color information can be acquired, as indicated by a broken line portion 702. Arrow 731 schematically indicates time of a captured image from the visible light image sensor 121 and data output time. In normal composition, captured images of the same frame are composited. In this embodiment, however, the exposure times and exposure timings of the visible light image sensor 121 and the infrared light image sensor 122 are different. In this embodiment, the exposure time 721 of the visible light image sensor 121 is longer than the exposure time 723 of the infrared light image sensor 122. Therefore, a visible light image and an infrared light image are not generated synchronously. In this case, color information extracted from the visible light image output from the visible light image sensor 121 at time 731 is composited with infrared light images output from the infrared light image sensor 122 at times 732 and 733 after the color information is extracted. At this time, especially when an object moves, the position of an object image may be different between the infrared light images and the visible light image. Composition processing according to this embodiment for solving this problem will be described with reference to FIGS. 8 and 9.

Figure 8:
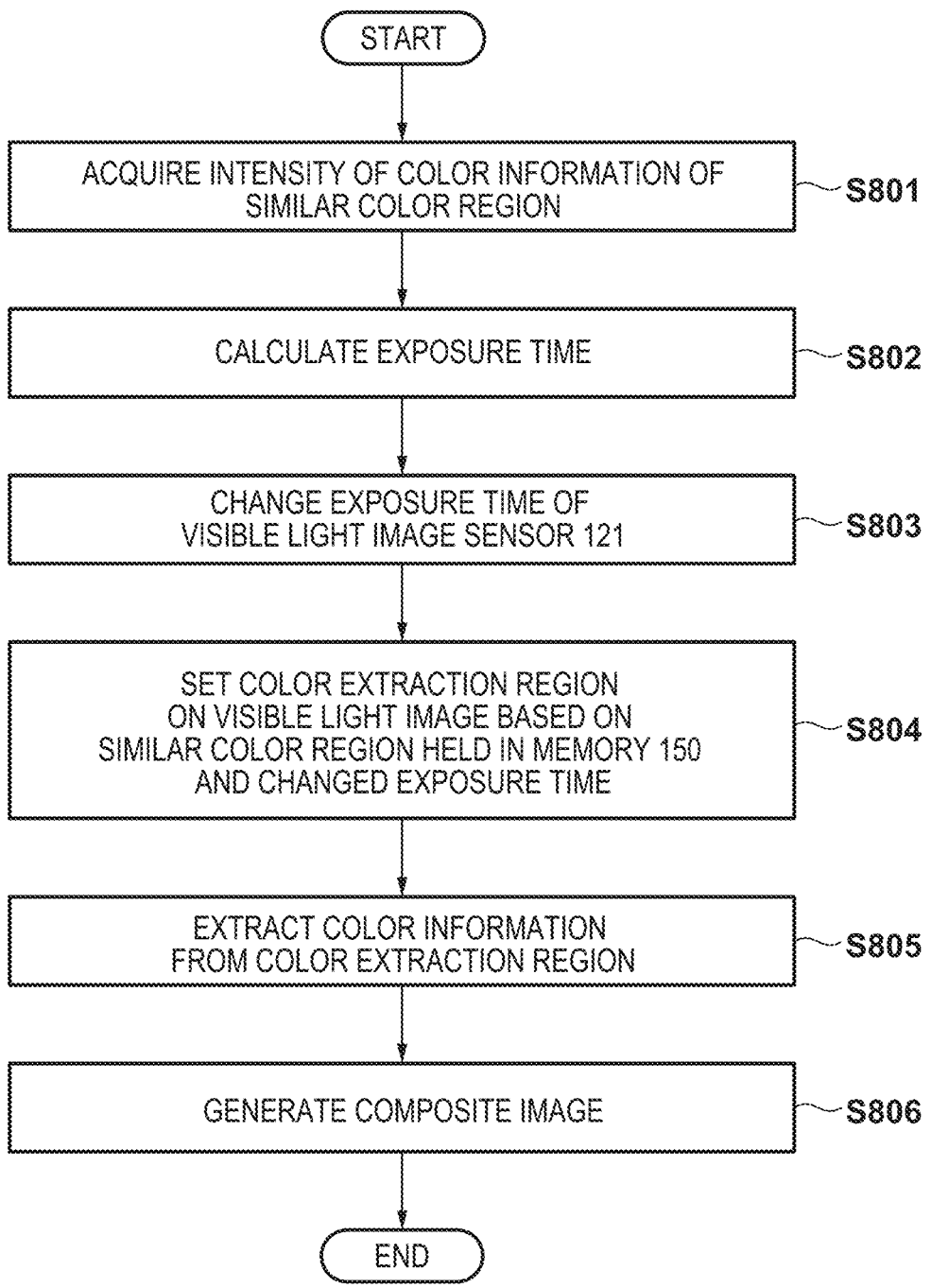
FIG. 8 is a flowchart illustrating an example of image composition processing according to the other exemplary embodiment.

FIG. 8 is a flowchart for explaining image processing at the time of the operation of the broken line portion 702 shown in FIG. 7. Processing corresponding to the flowchart can be implemented when, for example, one or more processors (CPU and MPU) functioning as a control unit 130 and the image processing unit 140 execute a corresponding program.

FIG. 8 shows an operation when the display intensity of the color enhancement display portion is changed by operating the slide bar 514 or 515 by the user in the state in which the color enhancement display mode is already selected. In step S801, the control unit 130 acquires information of the display intensity changed by the user operation in the information processing apparatus 190. Subsequently, in step S802, the control unit 130 calculates an exposure time in accordance with the display intensity set by the user. The control unit 130 transmits the calculated exposure time to the exposure time control unit 602. In step S803, the exposure time control unit 602 changes the exposure time of the visible light image sensor. In step S804, a corresponding region is set on the visible light image based on region information of a similar color region before the change of the exposure time stored in a memory 150. The region information stored in the memory 150 can be the color information of the similar color region stored in step S304 of FIG. 3 in the first embodiment. Furthermore, in accordance with the changed exposure time, a similar color region detection unit 144 decides a color extraction region where a color extraction unit 143 extracts color information. If the exposure time is extended, the color extraction region is narrower than that before the extension.

In step S805, with respect to the color extraction region set by the similar color region detection unit 144, the color extraction unit 143 extracts color information from the visible light image. In step S806, an image composition unit 145 composites the infrared light image and the color information acquired from the visible light image to generate a color enhancement composite image. At this time, a similar color region set in the infrared light image can be a region set as a result of tracking the similar color region acquired in step S804 in the infrared light image. After that, the generated composite image is transmitted to the information processing apparatus 190.

Figure 9:
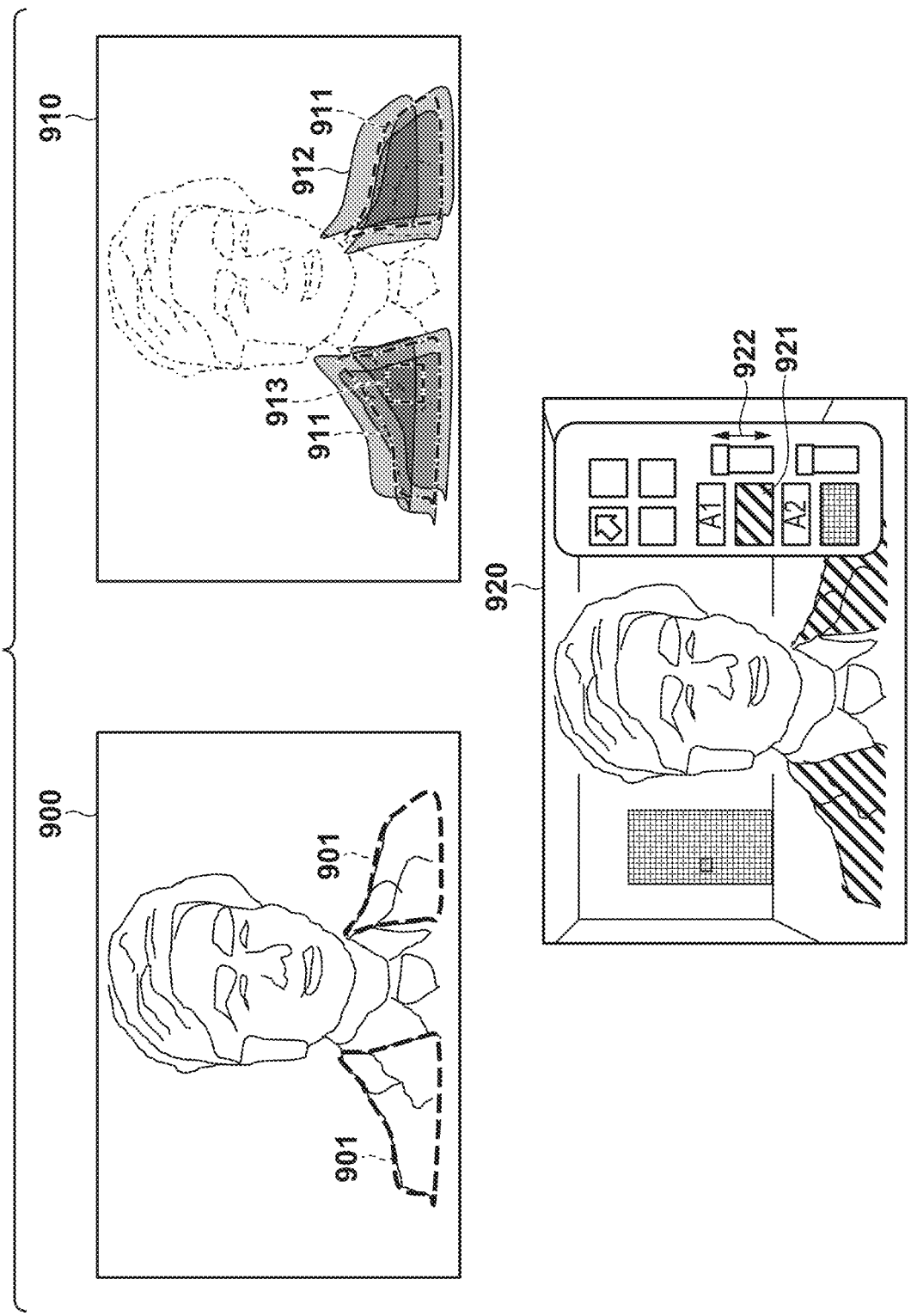
FIG. 9 is a view for explaining the example of the image composition processing according to the other exemplary embodiment.

FIG. 9 is a schematic view showing a color information acquisition method in long-second exposure at the time of the operation shown in FIG. 8. In FIG. 9, an image 900 indicates an infrared light image, and an image 910 indicates a visible light image. Regions 901 in the image 900 are regions obtained by reflecting, on the infrared light image, the similar color regions decided in the visible light image before the exposure time is changed. The region information and the color information detected when the user selects the target object in the color enhancement display mode are saved in the memory 150. The similar color regions decided once on the visible light image can be tracked only from the infrared light image even after the change of the exposure time. The similar color regions may be trackable when the similar color region detection unit 144 detects an edge or a moving body on the infrared light image. Alternatively, the similar color regions may be continuously tracked by providing a moving body detection function in the control unit 130. This makes it possible to newly specify, in the infrared light image to be used for composition, regions corresponding to the similar color regions decided on the visible light image. Therefore, even if the exposure timings of the visible light image and the infrared light image shift from each other, the color information extracted from the visible light image can be superimposed on the object region intended by the user.

The visible light image corresponding to the infrared light image of the image 900 is an image indicated by the image 910, and is in a state in which the exposure time is set longer than that of the infrared light image. Regions 911 shown in the image 910 are regions where the regions 901 reflected on the infrared light image are projected. A region 912 is a region which is newly detected as a similar color region on the visible light image in a state in which the object image blurs due to long-second exposure. If the exposure time of the visible light image is set to long-second exposure, when the object moves, a range in which the object image is formed on the visible light image is wider than that on the infrared light image. On the other hand, since the exposure time can be shortened for the object on the infrared light image, the object image never blurs even if the object image is a moving body.

A region 913 is a color extraction region set, by the similar color region detection unit 144, as a region where the color extraction unit 143 extracts color information from the visible light image. If the exposure time of the visible light image sensor 121 is sufficiently short, color information is extracted from the broken line region 911. However, if the object moves, the object image blurs, and thus color mixture with a surrounding object occurs in a peripheral portion. Therefore, by narrowing the color extraction region in accordance with the exposure time, as indicated by the region 913, the influence of the surrounding object is hardly exerted. At this time, the shape of the extracted color extraction region is not limited to a rectangular shape, and may be an arbitrary shape. In addition, since the exposure time of the visible light image sensor 121 is prolonged, it is possible to obtain a sufficient luminance. This can acquire more accurate color information of the object.

A display screen 920 shows an example of a screen displayed on a display unit 192 of the information processing apparatus 190 when the color extraction unit extracts the color information of the region 913. If the exposure time is prolonged, a pixel value may be saturated at some point. Since the current color extraction result is displayed in a color information display region 921, the user can visually determine whether the selected similar color region is saturated. At this time, the noise evaluation unit 601 may determine based on the pixel value of the visible light image whether the similar color region of the visible light image is saturated.

If the noise evaluation unit 601 determines that the similar color region is saturated, the control unit 130 can output, via a communication unit 170, information for making a predetermined notification such as warning display in the information processing apparatus 190. The notification may be configured to notify the user that no more operation can be performed, by limiting a slide bar movable range 922. Alternatively, the notification may be configured to perform warning display on the display unit 192 of the information processing apparatus 190 to indicate, to the user, that the similar color region is saturated.

As described above, it is possible to reduce the influence of noise of the visible light image by performing composition processing to superimpose the color information on the infrared light image. Furthermore, since the exposure time of the visible light image sensor is prolonged, it is possible to obtain a sufficient luminance. This can acquire more accurate color information of the object. In addition, it is possible to reduce the influence of blurring of the object image in the visible light image at the time of long-second exposure by compositing the color information extracted from the visible light image on the infrared light image. Furthermore, the influence of a surrounding object is hardly exerted by narrowing the color extraction region in accordance with the exposure time.

Third Embodiment

This embodiment will describe a method of adjusting the exposure time of a visible light image sensor 121 when performing color enhancement display. The arrangement of an image capturing apparatus 100 according to this embodiment is the same as that shown in FIG. 6 in the second embodiment. This embodiment will explain a method of adjusting the exposure time of the visible light image sensor 121 by determining the image quality (a noise amount and the presence/absence of a saturated pixel) of a visible light image.

Figure 10:
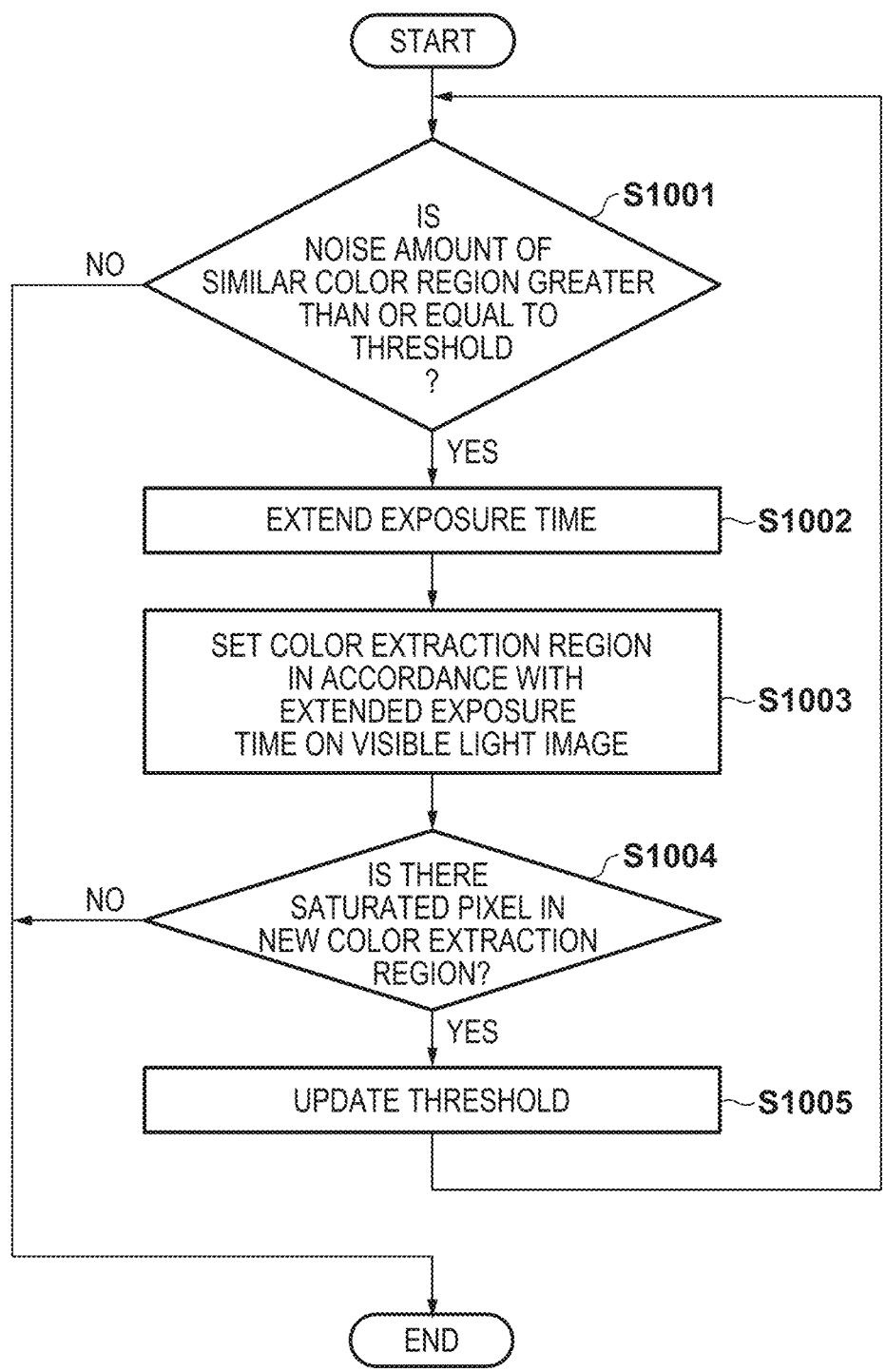
FIG. 10 is a flowchart illustrating an example of exposure time control processing according to still another exemplary embodiment.

FIG. 10 is a flowchart for deciding an exposure time. Processing corresponding to the flowchart can be implemented when, for example, one or more processors (CPU and MPU) functioning as a control unit 130 and an image processing unit 140 execute a corresponding program. The processing corresponding to the flowchart may be executed when, for example, the exposure time is changed in accordance with the flowchart shown in FIG. 8 in the second embodiment and a composite image according to the changed exposure time is generated.

In step S1001, the control unit 130 transfers, to a noise evaluation unit 601, region information of a color extraction region set in step S804 by a similar color region detection unit 144. The noise evaluation unit 601 evaluates the noise amount of the color extraction region of the visible light image, and returns a determination result to the control unit 130. The control unit 130 determines whether the noise amount is equal to or smaller than a predetermined threshold. If it is determined that the noise amount is equal to or smaller than the threshold, it is determined that the current exposure time of the visible light image sensor 121 has no problem, and the exposure time determination processing is terminated. In this case, the exposure time remains unchanged from a value set in step S803.

On the other hand, if it is determined in step S1001 that the noise amount of the visible light image exceeds the predetermined threshold, the control unit 130 sends, to an exposure time control unit 602, an instruction to extend the exposure time of the visible light image sensor 121. In step S1002, the exposure time control unit 602 sets the exposure time of the visible light image sensor 121 based on the instruction of the control unit 130. In step S1003, the control unit 130 newly sets, based on a similar color region stored in a memory 150 and the newly set exposure time, a color extraction region where color information is extracted, and sends an instruction to the noise evaluation unit 601.

In step S1004, the noise evaluation unit 601 determines whether a pixel (saturated pixel) whose pixel value is saturated exists in the newly set color extraction region, and returns a determination result to the control unit 130. If there is no saturated pixel in the new color extraction region, the exposure time set in step S1002 is decided as the exposure time of the visible light image sensor 121, thereby terminating this processing. On the other hand, if there is a saturated pixel in the color extraction region, the process advances to step S1005, and the control unit 130 updates the determination threshold of the noise amount to a threshold smaller than the last threshold, and then returns to step S1001 to determine a noise evaluation value.

By repeating the processes in steps S1001 to S1005 above, it is possible to decide an exposure time with which the noise amount of the color extraction region is smallest and no pixel value is saturated. After deciding the exposure time, the control unit 130 instructs, to a color extraction unit 143, a color extraction region corresponding to the decided exposure time. Upon extracting color information of the color extraction region, the color extraction unit 143 transfers the extracted color information to an image composition unit 145 and the control unit 130. After that, the image composition unit 145 composites the color information extracted from the visible light image and an infrared light image based on similar color region information held in the memory 150, thereby generating a color enhancement composite image. After that, the generated composite image is transmitted to an information processing apparatus 190.

As described above, in this embodiment, the exposure time of the visible light image sensor 121 can be adjusted in accordance with the image quality of the color extraction region. At this time, by prolonging the exposure time of the visible light image sensor 121, it is possible to suppress the noise amount while obtaining a sufficient luminance, and thus more accurate color information of an object can be obtained.

The exemplary embodiments have been described above. However, the present invention is not limited to these specific embodiments, and can incorporate various forms without departing from the scope of the present invention. Some of the above-described embodiments may also appropriately be combined.

Other Embodiments

Embodiment(s) of the present invention can also be realized by a computer of a system or apparatus that reads out and executes computer executable instructions (e.g., one or more programs) recorded on a storage medium (which may also be referred to more fully as anon-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-007955, filed on Jan. 21, 2019 which is hereby incorporated by reference herein in its entirety.

What is claimed is:

1. An image processing apparatus comprising:
   a specifying unit configured to specify, in a visible light image, a region having color information similar to first color information at a position where the visible light image is designated;
   an extraction unit configured to extract second color information from the specified region in the visible light image; and
   a composition unit configured to generate a composite image by superimposing the second color information on the specified region in an invisible light image synchronously captured by an optical system common to the visible light image,
   wherein the second color information is a central value of the color information included in the specified region.

2. The apparatus according to claim 1, wherein the specifying unit specifies, as the region having the similar color information, a region including a pixel having color information belonging to a predetermined color difference range based on the first color information.

3. The apparatus according to claim 1, further comprising:
   an image capturing apparatus including:
   one optical system;
   a visible light image sensor configured to receive visible light having passed through the one optical system and generate a visible light image; and
   an invisible light image sensor configured to receive invisible light having passed through the one optical system and generate an invisible light image; and
   a control unit configured to control an exposure time of the visible light image sensor.

4. The apparatus according to claim 3, wherein
   the invisible light is infrared light, and
   the image processing apparatus further comprises an illumination device configured to illuminate, with infrared light, an object to be captured by the image capturing apparatus.

5. The apparatus according to claim 3, further comprising an acquisition unit configured to acquire an instruction to change an intensity of the second color information,
wherein if the acquisition unit acquires the instruction, the control unit adjusts the exposure time in accordance with the change of the intensity.

6. The apparatus according to claim 5, wherein if the control unit extends the exposure time, the extraction unit extracts the second color information from an extraction region narrower than the specified region.

7. The apparatus according to claim 6, wherein the exposure time extended by the control unit is longer than an exposure time of the invisible light image sensor.

8. The apparatus according to claim 6, wherein if the exposure time is extended, the composition unit generates the composite image by superimposing the second color information extracted from the extraction region on an invisible light image generated after the second color information is extracted from a visible light image captured with the extended exposure time.

9. The apparatus according to claim 8, wherein the composition unit superimposes the second color information extracted from the extraction region on a region, corresponding to the specified region, in the generated invisible light image.

10. The apparatus according to claim 6, further comprising an output unit configured to output a notification when a pixel value included in the specified region is saturated in the visible light image captured with the exposure time according to the change of the intensity of the second color information.

11. The apparatus according to claim 10, further comprising a determination unit configured to determine image quality of the extraction region,
wherein the control unit further adjusts the exposure time in accordance with an image quality determination result by the determination unit.

12. The apparatus according to claim 11, wherein if the determination unit determines that a noise amount of the extraction region exceeds a threshold, the control unit extends the exposure time.

13. The apparatus according to claim 12, wherein if the determination unit determines that the extraction region includes a saturated pixel, the threshold is changed to a smaller value.

14. A system comprising:
an image processing apparatus including:
a specifying unit configured to specify, in a visible light image, a region having color information similar to first color information at a position where the visible light image is designated;
an extraction unit configured to extract second color information from the specified region in the visible light image; and
a composition unit configured to generate a composite image by superimposing the second color information on the specified region in an invisible light image synchronously captured by an optical system common to the visible light image,
wherein the second color information is a central value of the color information included in the specified region; and
an information processing apparatus configured to acquire the composite image by communicating with the image processing apparatus.

15. An image processing method comprising:
specifying, in a visible light image, a region having color information similar to first color information at a position where the visible light image is designated;
extracting second color information from the specified region in the visible light image; and
generating a composite image by superimposing the second color information on the specified region in an invisible light image synchronously captured by an optical system common to the visible light image,
wherein the second color information is a central value of the color information included in the specified region.

16. A non-transitory computer-readable storage medium storing one or more program including instructions that, when executed by a processor of an image processing apparatus, causes the processor to perform operations of:
specifying, in a visible light image, a region having color information similar to first color information at a position where the visible light image is designated;
extracting second color information from the specified region in the visible light image; and
generating a composite image by superimposing the second color information on the specified region in an invisible light image synchronously captured by an optical system common to the visible light image,
wherein the second color information is a central value of the color information included in the specified region.

* * * * *